US008562480B1

(12) United States Patent
Mellet et al.

(10) Patent No.: US 8,562,480 B1
(45) Date of Patent: Oct. 22, 2013

(54) VEHICLE DRIVETRAIN WITH AN ELECTRIC TORQUE CONVERTER

(75) Inventors: Edward W. Mellet, Rochester Hills, MI (US); Shawn H. Swales, Canton, MI (US); Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/486,294

(22) Filed: Jun. 1, 2012

(51) Int. Cl.
*F16H 3/44* (2006.01)
(52) U.S. Cl.
USPC ............................ 475/317; 475/5; 903/910
(58) Field of Classification Search
USPC .............................. 475/5, 317, 318, 321, 322; 903/910–912; 180/65.235, 65.225, 180/65.245, 65.265
See application file for complete search history.

(56) References Cited

U.S. PATENT DOCUMENTS

| 6,492,742 | B1 | 12/2002 | Fujikawa et al. |
| 8,182,391 | B2 * | 5/2012 | Klemen et al. ..................... 477/5 |
| 2006/0019784 | A1 * | 1/2006 | Sowul et al. ...................... 475/5 |
| 2007/0275808 | A1 * | 11/2007 | Iwanaka et al. .................... 475/5 |
| 2009/0321157 | A1 * | 12/2009 | Sowul et al. .............. 180/65.22 |
| 2011/0212809 | A1 * | 9/2011 | Tsutsui et al. ..................... 477/5 |

* cited by examiner

*Primary Examiner* — Justin Holmes
(74) *Attorney, Agent, or Firm* — Quinn Law Group, PLLC

(57) ABSTRACT

A powertrain includes an Electric Torque Converter (ETC) assembly interconnecting a primary power source and a transmission. An ETC clutch connects a clutched ETC input from the ETC assembly to an output of the primary power source. A primary transmission clutch connects a clutched input of the transmission to the output of the primary power source. An ETC output from the ETC assembly is directly connected to a fixed input of the transmission. The ETC assembly includes a planetary gearset interconnecting the clutched ETC input and the ETC output of the ETC assembly. An electric motor is coupled to the planetary gearset and configured to provide a torque thereto. The torque may be directed to either the fixed input of the transmission through the ETC output of the ETC assembly, or to the output of the primary power source through the clutched ETC input of the ETC assembly.

14 Claims, 3 Drawing Sheets

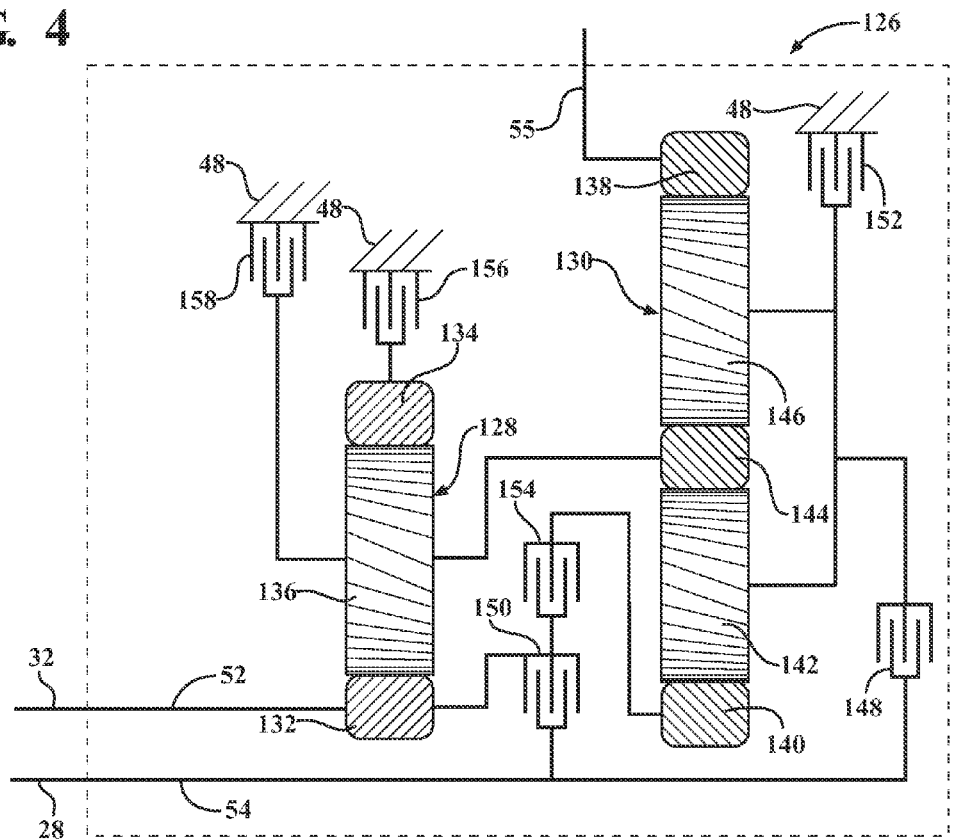
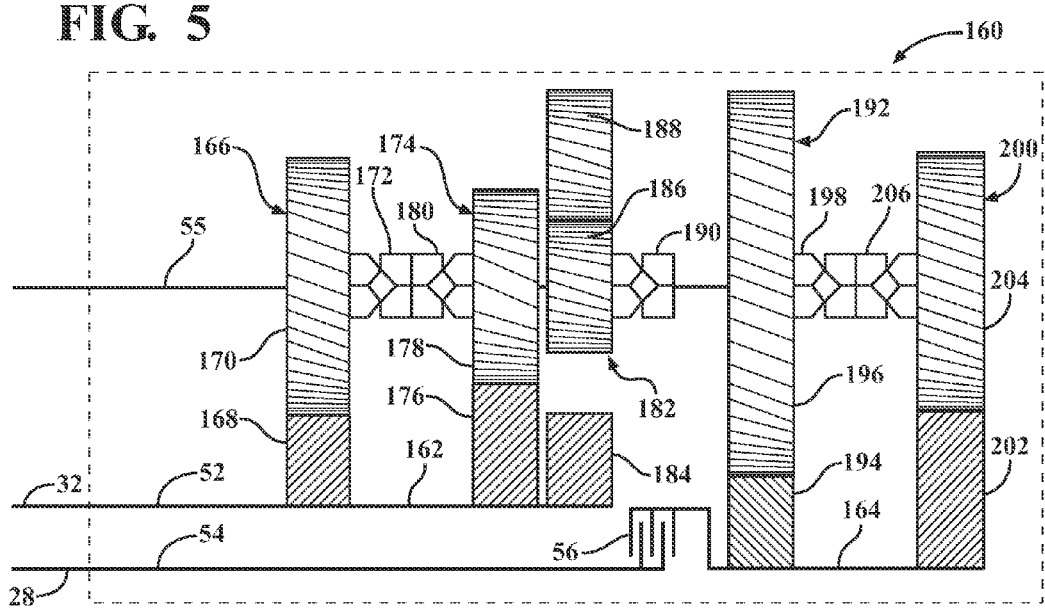

VEHICLE DRIVETRAIN WITH AN ELECTRIC TORQUE CONVERTER

TECHNICAL FIELD

The invention generally relates to a drivetrain for a vehicle, and more specifically to transmission having an electric torque converter coupled thereto.

BACKGROUND

Many variants of hybrid vehicles include an internal combustion engine having an output that is coupled to a transmission and configured for providing a torque to the transmission. The transmission may include an automatic transmission having a typical fluid coupling, i.e., a fluid torque converter, interconnecting the output of the internal combustion engine and an input of the transmission. However, some hybrid vehicles have replaced the fluid torque converter with an electric torque converter having one or more electric motors configured for regulating the power flow between the output of the internal combustion engine and the input of the transmission.

SUMMARY

A drivetrain for a vehicle is provided. The drivetrain includes a primary power source. The primary power source includes a primary output that is configured for transmitting a torque. An Electric Torque Converter (ETC) assembly includes a clutched ETC input, an ETC clutch, an ETC output, an ETC planetary gearset, and an electric motor. The clutched ETC input is coupled to the primary output of the primary power source through the ETC clutch. The ETC clutch is selectively engageable to connect the clutched ETC input and the primary output for torque transmission therebetween. The ETC planetary gearset interconnects the clutched ETC input and the ETC output. The electric motor is coupled to the ETC planetary gearset. The drivetrain further includes a transmission. The transmission includes a geartrain operable to define a plurality of different gear ratios. The transmission includes a fixed input and a clutched input. The fixed input is directly connecting the geartrain and the ETC output of the ETC assembly for continuous torque transmission therebetween. The clutched input includes a primary transmission clutch that is selectively engageable to connect the geartrain and the primary output of the primary power source for torque transmission therebetween.

An Electric Torque Converter (ETC) assembly for a hybrid vehicle is also provided. The ETC assembly includes an electric motor, a clutched ETC input, a ETC output and a planetary gearset. The ETC output is configured for directly connecting to a fixed input of a transmission. The planetary gearset includes a sun gear connected to the electric motor, a ring gear connected to the clutched ETC input, and a planetary carrier rotatably supporting a plurality of planetary gears in meshing engagement with and interconnecting the sun gear and the ring gear. The planetary carrier is connected to the ETC output.

Accordingly, the ETC output of the ETC assembly is connected to the transmission through the fixed input, and the clutched ETC input of the ETC assembly is connected to the transmission via the output of the primary power source, e.g., an internal combustion engine, through the clutched input of the transmission. Accordingly, the primary power source includes no direct or fixed connection to the transmission. The ETC assembly may be operated in different power flow paths to power the transmission directly through the ETC output of the ETC assembly without a friction launch and with the mechanical advantage provided by the ETC planetary gearset, or may be used to supplement and/or regulate the power flow between the primary power source and the transmission through the clutched ETC input of the ETC assembly, all with the use of a single electric motor.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic diagram showing a third embodiment of the transmission for the powertrain.

FIG. 5 is a schematic diagram showing a fourth embodiment of the transmission for the powertrain.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
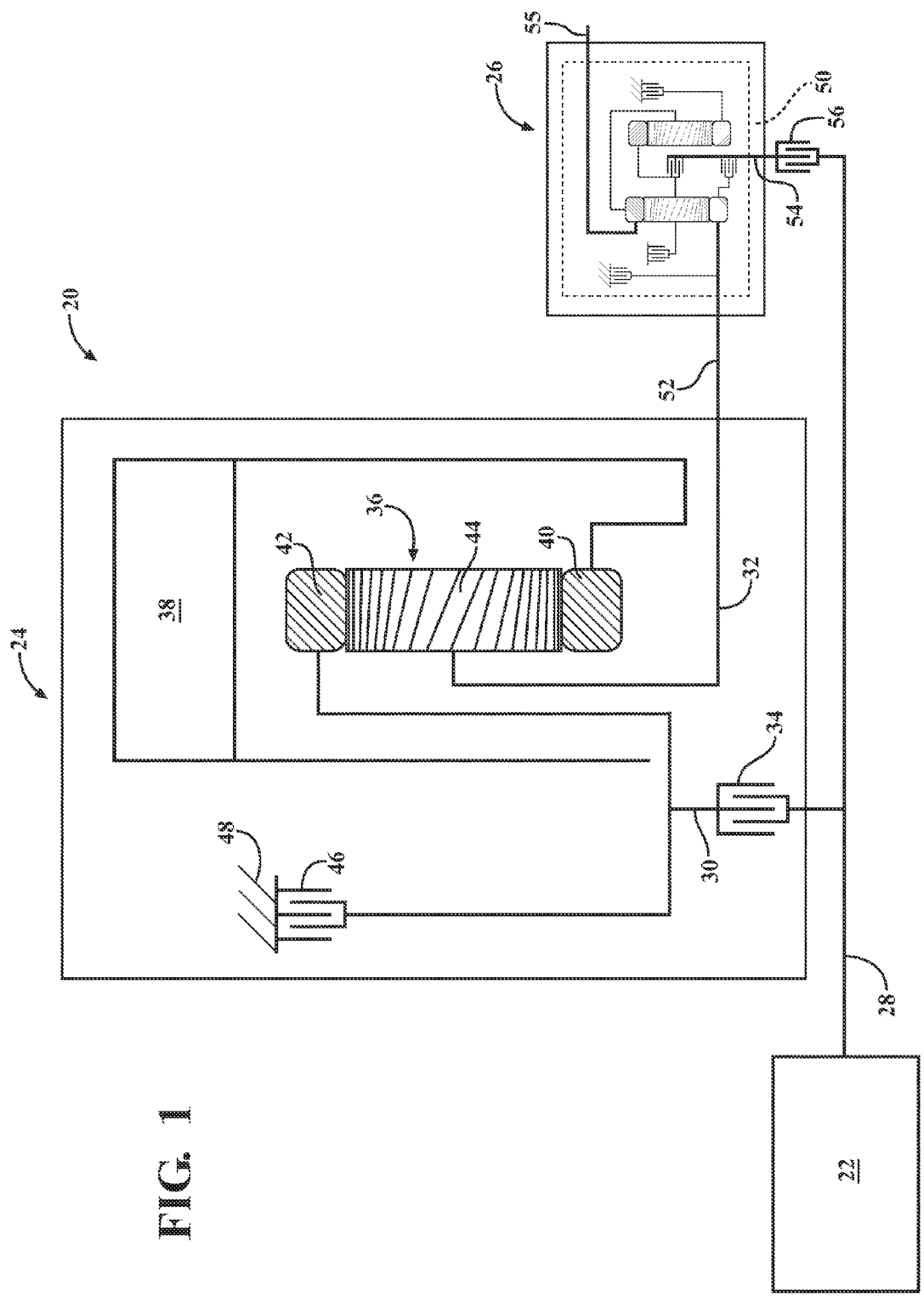
FIG. 1 is a schematic diagram showing a powertrain for a vehicle.

Referring to the Figures, wherein like numerals indicate like parts throughout the several views, a drivetrain is generally shown at 20 in FIG. 1. The drivetrain 20 is for a vehicle including but not limited to a hybrid vehicle.

The drivetrain 20 includes a primary power source 22, an Electric Torque Converter (ETC) assembly 24 and a transmission 26. The primary power source 22 may include but is not limited to an internal combustion engine, such as a gasoline or diesel engine. However, it should be appreciated that the primary power source 22 may include any other torque generating source. The primary power source 22 includes a primary output 28, e.g., an output shaft. The primary output 28 is configured for transmitting a torque from the primary power source 22 to the transmission 26.

The ETC assembly 24 includes a clutched ETC input 30 and an ETC output 32. An ETC clutch 34 couples the clutched ETC input 30 of the ETC assembly 24 to the primary output 28 of the primary power source 22. The ETC clutch 34 is selectively engageable to connect the clutched ETC input 30 and the primary output 28 in torque transmitting communication therebetween. As such, the ETC clutch 34 may be engaged or activated to connect the clutched ETC input 30 and the primary output 28 to transmit torque therebetween, or the ETC clutch 34 may be disengaged or de-activated to disconnect the clutched ETC input 30 from the primary output 28 to allow relative rotation or movement therebetween. The ETC clutch 34 may include but is not limited to one of a multi-plate clutch, a dog clutch, or a single one way clutch.

A planetary gearset 36 interconnects the clutched ETC input 30 and the ETC output 32. An electric motor 38 is coupled to the planetary gearset 36. More specifically, the planetary gearset 36 includes a sun gear 40, a ring gear 42 and a planetary carrier 44 rotatably supporting a plurality of planetary gears in meshing engagement with and interconnecting the sun gear 40 and the ring gear 42. The clutched ETC input 30 is attached to and rotatable with the ring gear 42. The electric motor 38 is attached to the sun gear 40 and configured to supply a torque thereto. The ETC output 32 is attached to and rotatable with the planetary carrier 44. The planetary gearset 36 of the ETC assembly 24 provides a mechanical advantage to increase the torque supplied by the electric motor 38, thereby reducing the required size and/or power of the electric motor 38.

The ETC assembly 24 may further include an Electric Vehicle (EV) brake 46. The EV brake 46 couples the clutched ETC input 30 of the ETC assembly 24 to a stationary member 48. The stationary member 48 may include any structure that remains stationary or does not move relative to the clutched ETC input 30, such as but not limited to a housing or casing of the transmission 26. The EV brake 46 is selectively engageable to connect the clutched ETC input 30 and the stationary member 48 to prevent torque transmission 26 and/or movement of the clutched ETC input 30. As such, the EV brake 46 may be engaged or activated to connect the clutched ETC input 30 and the stationary member 48, thereby preventing movement of the clutched ETC input 30 and torque transmission 26 therethrough. Alternatively, the EV brake 46 may be disengaged or de-activated to disconnect the clutched ETC input 30 from the stationary member 48 to allow relative rotation or movement of the clutched ETC input 30 relative to the stationary member 48 and allow torque transmission 26 through the clutched ETC input 30. The EV brake 46 may include but is not limited to one of a multi-plate clutch, a dog clutch, or a single one way clutch.

Figure 2:
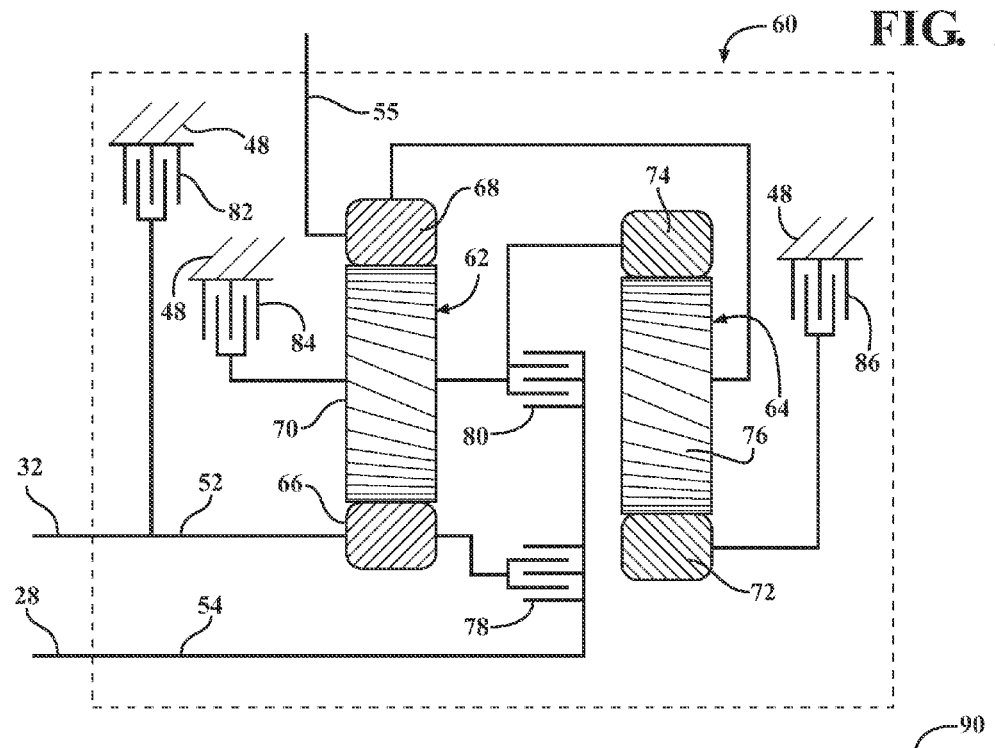
FIG. 2 is a schematic diagram showing a first embodiment of a transmission of the powertrain.
Figure 3:
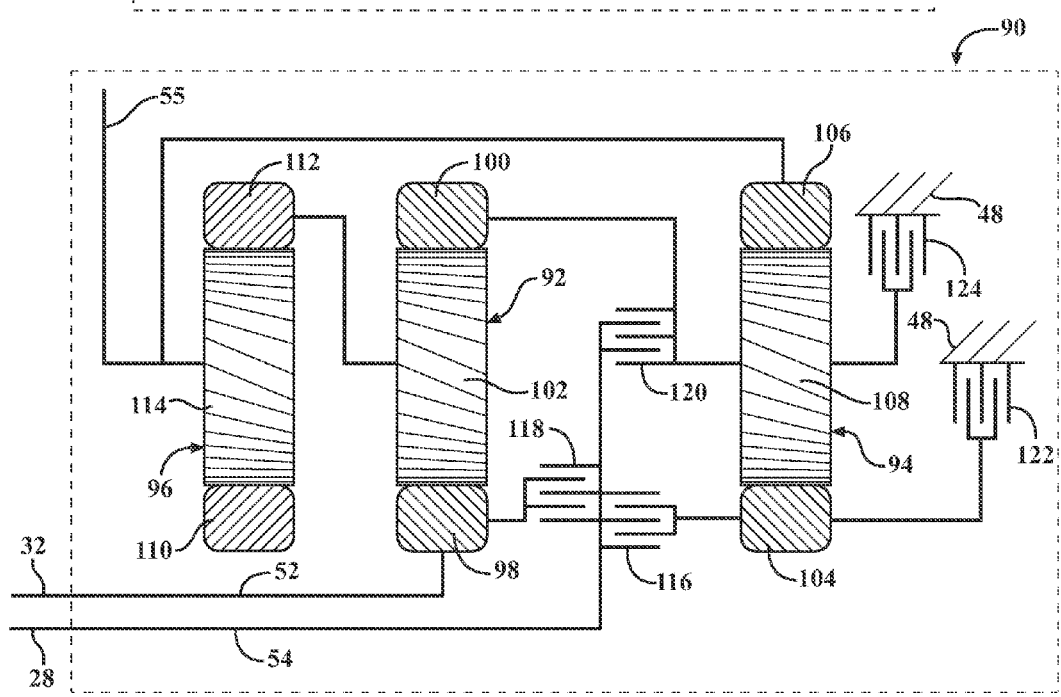
FIG. 3 is a schematic diagram showing a second embodiment of the transmission of the powertrain.

The transmission 26 includes a geartrain 50 having a fixed input 52 and a clutched input 54 coupled thereto. The geartrain 50 is operable to define a plurality of different gear ratios to provide a desired rotational speed and/or torque to a transmission output 55. The geartrain 50 may include but is not limited to a four speed planetary geartrain 50 such as shown in FIG. 2, a six speed planetary geartrain 50 such as shown in FIG. 3, a seven speed planetary geartrain 50 such as shown in FIG. 4, or a four speed layshaft geartrain 50 such as shown in FIG. 5.

The fixed input 52 is directly connected to the geartrain 50 and the ETC output 32 of the ETC assembly 24 for continuous torque transmission 26 therebetween. Accordingly, the ETC output 32 of the ETC assembly 24 is directly connected to a component of the geartrain 50 for continuous torque transmission 26 therebetween to define the fixed input 52. Therefore, anytime the electric motor 38 is engaged to power the ETC assembly 24, the power flows through the planetary geartrain 50 of the ETC assembly 24 to the ETC output 32 of the ETC assembly 24, and from the ETC output 32 to the geartrain 50 of the transmission 26 to thereby define the fixed input 52.

A primary transmission clutch 56 couples the geartrain 50 to the primary output 28 of the primary power source 22 to define the clutched input 54 of the transmission 26. The primary transmission clutch 56 is selectively engageable to connect a component of the geartrain 50 and the primary output 28 in torque transmitting communication therebetween. As such, the primary transmission clutch 56 may be engaged or activated to connect the geartrain 50 and the primary output 28 to transmit torque therebetween, or the primary transmission clutch 56 may be disengaged or de-activated to disconnect the geartrain 50 from the primary output 28 to allow relative rotation or movement therebetween. The primary transmission clutch 56 may include but is not limited to one of a multi-plate clutch, a dog clutch, or a single one way clutch.

Prior art electric torque converters have required an additional clutch interconnecting the components of the ETC planetary gear set to provide full functionality. However, it has been discovered that the same functionality may be achieved without the clutch interconnecting the components of the ETC planetary gearset by configuring the drivetrain as described above.

Accordingly, the drivetrain 20 described above is capable of achieving several different power flow paths. For example, with the primary transmission clutch 56 engaged and the ETC clutch 34 disengaged, power from the primary power source 22 flows from the primary output 28 of the primary power source 22 to the geartrain 50 through the clutched input 54 of the transmission 26. With the ETC clutch 34 engaged, the EV brake 46 disengaged, and a torque reactionary force provided to the ETC assembly 24 through the ETC output via a brake in the geartrain 50, power from the electric motor 38 may flow through the clutched ETC input 30 of the ETC assembly 24 to the primary output 28 of the primary power source 22 to regulate and/or supplement the torque transmitted via the primary output 28. With the ETC clutch 34 engaged, power from the primary power source 22 may flow through the ETC clutch 34 into the clutched ETC input 30 and through the ETC planetary gearset 36, whereupon the power may be split between the electric motor 38 and the ETC output 32. With the ETC clutch 34 engaged, power from the primary power source 22 may flow through the ETC clutch 34 into the clutched input 30 of the ETC assembly 24, and also through the primary transmission clutch 56 into the clutched input 54 of the geartrain 50. This particular power flow provides a fixed gear ratio between the primary power source 22 and the electric motor 38 through the ETC planetary gearset 36, with the fixed gear ratio being defined by the gear ratio of the geartrain 50. With the EV brake 46 engaged, the ETC clutch 34 disengaged, and the primary transmission clutch 56 disengaged to disconnect the geartrain 50 from the primary output 28, power from the electric motor 38 may flow through the ETC output 32 of the ETC assembly 24 to the geartrain 50 via the fixed input 52 of the transmission 26, thereby allowing the vehicle to operate under power from the electric motor 38 only.

As noted above, the geartrain 50 of the transmission 26 may include any desirable geartrain 50 capable of receiving a torque input through the fixed input 52 and/or the clutched input 54 of the transmission 26. Examples of suitable geartrains 50 are provided in FIGS. 2 through 5. However, it should be appreciated that the geartrain 50 may be configured in some other manner not shown or described herein, and that the configuration of the geartrain 50 is not limited to the exemplary embodiment shown in FIGS. 2 through 5.

Referring to FIG. 2, the geartrain 50 is shown embodied as a four speed planetary geartrain 60. The four speed planetary geartrain 60 includes a first planetary gearset 62 and a second planetary gearset 64. The first planetary gearset 62 includes a sun gear 66, a ring gear 68, and a planetary carrier 70 supporting a plurality of planetary gears in meshing engagement with the sun gear 66 and the ring gear 68. Similarly, the second planetary gearset 64 includes a sun gear 72, a ring gear 74, and a planetary carrier 76 supporting a plurality of planetary gears in meshing engagement with the sun gear 72 and the ring gear 74. The planetary carrier 76 of the second planetary gearset 64 is coupled to the ring gear 68 of the first planetary gearset 62. The ETC output 32 of the ETC assembly 24 is coupled to the sun gear 66 of the first planetary gearset 62 to define the fixed input 52 of the transmission 26. As shown in the four speed planetary geartrain 60, the primary transmission clutch 56 includes a first clutch 78 and a second clutch 80. The first clutch 78 selectively connects or disconnects the primary output 28 of the primary power source 22 and the sun gear 66 of the first planetary gearset 62 to respectively allow or prevent torque transmission therebetween. The second clutch 80 selectively connects or disconnects the primary output 28 of the primary power source 22 with both the planetary carrier 70 of the first planetary gearset 62 and the ring gear 74 of the second planetary gearset 64 to respectively allow or prevent torque transmission therebetween. The four speed planetary geartrain 60 further includes a first brake 82, a second brake 84 and a third brake 86. The first brake 82 selectively connects or disconnects the ETC output 32 of the ETC assembly 24 to the stationary member 48 to respectively prevent or allow rotation or movement of the ETC output 32. The second brake 84 selectively connects or disconnects the planetary carrier 70 of the first planetary gearset 62 to the stationary member 48 to respectively prevent or allow rotation or movement of the planetary carrier 70 of the first planetary gearset 62. The third brake 86 selectively connects or disconnects the sun gear 72 of the second planetary gearset 64 to the stationary member 48 to respectively prevent or allow rotation or movement of the sun gear 72 of the second planetary gearset 64. The transmission output 55 is coupled to the ring gear 68 of the first planetary gearset 62. The various clutches and brakes of the four speed planetary geartrain 60 may be selectively engaged and/or disengaged to provide four forward gear ratios and a reverse gear.

Referring to FIG. 3, the geartrain 50 is shown embodied as a six speed planetary geartrain 90. The six speed planetary geartrain 90 includes a first planetary gearset 92, a second planetary gearset 94 and a third planetary gearset 96. The first planetary gearset 92 includes a sun gear 98, a ring gear 100, and a planetary carrier 102 supporting a plurality of planetary gears in meshing engagement with the sun gear 98 and the ring gear 100. The second planetary gearset 94 includes a sun gear 104, a ring gear 106, and a planetary carrier 108 supporting a plurality of planetary gears in meshing engagement with the sun gear 104 and the ring gear 106. Similarly, the third planetary gearset 96 includes a sun gear 110, a ring gear 112, and a planetary carrier 114 supporting a plurality of planetary gears in meshing engagement with the sun gear 110 and the ring gear 112. Both the ring gear 106 of the second planetary gearset 94 and the planetary carrier 114 of the third planetary gearset 96 are coupled to the transmission output 55. The planetary carrier 102 of the first planetary gearset 92 is coupled to the ring gear 112 of the third planetary gearset 96. The ETC output 32 from the ETC assembly 24 is coupled to the sun gear 98 of the first planetary gearset 92 to define the fixed input 52 of the transmission 26. As shown in the six speed planetary geartrain 90, the primary transmission clutch 56 includes a first clutch 116, a second clutch 118 and a third clutch 120. The first clutch 116 selectively connects or disconnects the primary output 28 of the primary power source 22 and the sun gear 104 of the second planetary gearset 94 to respectively allow or prevent torque transmission therebetween. The second clutch 118 selectively connects or disconnects the primary output 28 of the primary power source 22 with the sun gear 98 of the first planetary gearset 92 to respectively allow or prevent torque transmission therebetween. The third clutch 120 selectively connects or disconnects both the planetary carrier 108 of the second planetary gearset 94 and the ring gear 100 of the first planetary gearset 92 to respectively allow or prevent torque transmission therebetween. The six speed planetary geartrain 90 further includes a first brake 122 and a second brake 124. The first brake 122 selectively connects or disconnects the sun gear 104 of the second planetary gearset 94 to the stationary member 48 to respectively prevent or allow rotation or movement of the sun gear 104 of the second planetary gearset 94. The second brake 124 selectively connects or disconnects the planetary carrier 108 of the second planetary gearset 94 to the stationary member 48 to respectively prevent or allow rotation or movement of the planetary carrier 108 of the second planetary gearset 94. The various clutches and brakes of the six speed planetary geartrain 90 may be selective engaged and/or disengaged to provide six forward gear ratios and a reverse gear.

Referring to FIG. 4, the geartrain 50 is shown embodied as a seven speed planetary geartrain 126. The seven speed planetary geartrain 126 includes a first planetary gearset 128 and a second planetary gearset 130. The first planetary gearset 128 includes a sun gear 132, a ring gear 134, and a planetary carrier 136 supporting a plurality of planetary gears in meshing engagement with the sun gear 132 and the ring gear 134. The second planetary gearset 130 includes a compound planetary gearset having a ring gear 138, a first sun gear 140, a first planetary carrier 142 supporting a plurality of planetary gears in meshing engagement with the first sun gear 140 and the ring gear 138, a second sun gear 144, and a second planetary carrier 146 supporting a plurality of planetary gears in meshing engagement with the second sun gear 144 and the ring gear 138. The ring gear 138 of the second planetary gearset 130 is coupled to the transmission output 55. The planetary carrier 136 of the first planetary gearset 128 is coupled to the second sun gear 144 of the second planetary gearset 130. The ETC output 32 from the ETC assembly 24 is coupled to the sun gear 132 of the first planetary gearset 128 to define the fixed input 52 of the transmission 26. As shown in the seven speed planetary geartrain 126, the primary transmission clutch 56 includes a first clutch 148. The first clutch 148 selectively connects or disconnects the primary output 28 of the primary power source 22 with all of the first planetary carrier 142 of the second planetary gearset 130, the second planetary carrier 146 of the second planetary gearset 130, and to a first brake 152, to respectively allow or prevent torque transmission therebetween. A second clutch 150 selectively connects or disconnects the primary output 28 of the primary power source 22 with the sun gear 132 of the first planetary gearset 128 to respectively allow or prevent torque transmission therebetween. The seven speed planetary geartrain 126 further includes a third clutch 154 that selectively connects or disconnects the first sun gear 140 of the second planetary gearset 130 and the sun gear 132 of the first planetary gearset 128 to respectively allow or prevent torque transmission 26 therebetween. The seven speed planetary geartrain 126 includes the first brake 152 as noted above, and further includes a second brake 156 and a third brake 158. The first brake 152 selectively connects or disconnects all of the second planetary carrier 146 of the second planetary gearset 130, the first planetary carrier 142 of the second planetary gearset 130, and the primary output 28 from the primary power source 22 to the stationary member 48 to respectively prevent or allow rotation or movement of all of the second planetary carrier 146 of the second planetary gearset 130, the first planetary carrier 142 of the second planetary gearset 130, and the primary output 28 from the primary power source 22. The second brake 156 selectively connects or disconnects the ring gear 134 of the first planetary gearset 128 to the stationary member 48 to respectively prevent or allow rotation or movement of the ring gear 134 of the first planetary gearset 128. The third brake 158 selectively connects or disconnects the planetary carrier 136 of the first planetary gearset 128 to the stationary member 48 to prevent or allow rotation or movement of the planetary carrier 136 of the first planetary gearset 128. The various clutches and brakes of the seven speed planetary geartrain 126 may be selectively engaged and/or disengaged to provide six forward gear ratios and a reverse gear.

Referring to FIG. 5, the geartrain 50 is shown embodied as a four speed layshaft geartrain 160. The four speed layshaft geartrain 160 includes a first layshaft 162 coupled to the ETC output 32 from the ETC assembly 24 to define the fixed input 52 of the transmission 26, and a second layshaft 164 coupled to the primary output 28 of the primary power source 22 via the primary transmission clutch 56 to define the clutched input 54 of the transmission 26. A first gear combination 166 includes a first gear 168 and a second gear 170. The first gear 168 is fixedly attached to the first layshaft 162 for rotation therewith, and is in meshing engagement with the second gear 170. The second gear 170 is selectively coupled to the transmission output 55 through a first synchronizer 172. A second gear combination 174 includes a first gear 176 and a second gear 178. The first gear 176 is fixedly attached to the first layshaft 162 for rotation therewith, and is in meshing engagement with the second gear 178. The second gear 178 is selectively coupled to the transmission output 55 through a second synchronizer 180. A third gear combination 182 includes a first gear 184, a second gear 186 and a third gear 188. The first gear 184 is fixedly attached to the first layshaft 162 for rotation therewith. The second gear 186 is selectively coupled to the transmission output 55 through a third synchronizer 190. The third gear 188 is in meshing engagement with both the first gear 184 and the second gear 186. A fourth gear combination 192 includes a first gear 194 and a second gear 196. The first gear 194 is fixedly attached to the second layshaft 164 for rotation therewith, and is in meshing engagement with the second gear 196. The second gear 196 is selectively coupled to the transmission output 55 through a fourth synchronizer 198. A fifth gear combination 200 includes a first gear 202 and a second gear 204. The first gear 202 is fixedly attached to the second layshaft 164 for rotation therewith, and is in meshing engagement with the second gear 204. The second gear 204 is selectively coupled to the transmission output 55 through a fifth synchronizer 206.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A drivetrain for a vehicle, the drivetrain comprising:
a primary power source having a primary output configured for transmitting a torque;
an Electric Torque Converter (ETC) assembly having an clutched ETC input coupled to the primary output of the primary power source through an ETC clutch selectively engageable to connect the clutched ETC input and the primary output for torque transmission therebetween, an ETC output, an ETC planetary gearset interconnecting the clutched ETC input and the ETC output, and an electric motor coupled to the ETC planetary gearset; and
a transmission having a geartrain operable to define a plurality of different gear ratios, a fixed input directly connecting the geartrain and the ETC output of the ETC assembly for continuous torque transmission therebetween, and a clutched input having a primary transmission clutch selectively engageable to connect the geartrain and the primary output of the primary power source for torque transmission therebetween;
wherein the geartrain includes a first planetary gearset coupled to the fixed input, and a second planetary gearset coupled to the clutched input.

2. A drivetrain as set forth in claim 1 wherein the ETC planetary gearset includes a sun gear, a ring gear and a planetary carrier rotatably supporting a plurality of planetary gears in meshing engagement with and interconnecting the sun gear and the ring gear.

3. A drivetrain as set forth in claim 2 wherein the clutched ETC input is attached to and rotatable with the ring gear.

4. A drivetrain as set forth in claim 3 wherein the electric motor is attached to the sun gear.

5. A drivetrain as set forth in claim 4 wherein the ETC output is attached to and rotatable with the planetary carrier.

6. A drivetrain as set forth in claim 1 further comprising an Electric Vehicle (EV) brake selectively engageable to connect the clutched ETC input to a stationary member to prevent torque transmission through the clutched ETC input.

7. A drivetrain as set forth in claim 6 wherein the EV brake includes one of a multi-plate clutch, a dog clutch, or a single one way clutch.

8. A drivetrain as set forth in claim 1 wherein the primary power source includes an internal combustion engine.

9. A drivetrain as set forth in claim 1 wherein the ETC clutch includes one of a multi-plate clutch, a dog clutch, or a single one way clutch.

10. A drivetrain as set forth in claim 1 wherein the transmission includes at least one clutch selectively engageable to interconnect the first planetary gearset and the second planetary gearset in torque transmission therebetween.

11. A drivetrain as set forth in claim 10 wherein the transmission includes at least one brake coupled to at least one of the first planetary gearset and the second planetary gearset.

12. A drivetrain as set forth in claim 11 wherein the second planetary gearset includes a compound planetary gearset.

13. A drivetrain as set forth in claim 11 wherein the transmission further includes a third planetary gearset coupled to the first planetary gearset.

14. A drivetrain as set forth in claim 1 wherein the transmission includes a first layshaft coupled to the fixed input, and a second layshaft coupled to the clutched input.

* * * * *